(12) United States Patent
Nomura et al.

(10) Patent No.: US 10,156,633 B2
(45) Date of Patent: Dec. 18, 2018

(54) SENSOR SYSTEM, CONTROL DEVICE, AND SENSOR

(71) Applicants: DENSO CORPORATION, Kariya, Aichi-pref. (JP); NIPPON SOKEN, INC., Nishio, Aichi-pref. (JP)

(72) Inventors: Takuya Nomura, Kariya (JP); Taketo Harada, Kariya (JP); Mitsuyasu Matsuura, Nishio (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 199 days.

(21) Appl. No.: 15/033,029

(22) PCT Filed: Oct. 22, 2014

(86) PCT No.: PCT/JP2014/005354
§ 371 (c)(1),
(2) Date: Apr. 28, 2016

(87) PCT Pub. No.: WO2015/064061
PCT Pub. Date: May 7, 2015

(65) Prior Publication Data
US 2016/0245914 A1 Aug. 25, 2016

(30) Foreign Application Priority Data
Nov. 4, 2013 (JP) .................................. 2013-228890

(51) Int. Cl.
*G01S 15/93* (2006.01)
*H04Q 9/00* (2006.01)
(Continued)

(52) U.S. Cl.
CPC ............ *G01S 15/931* (2013.01); *G01S 7/526* (2013.01); *G01S 15/876* (2013.01); *H04Q 9/00* (2013.01);
(Continued)

(58) Field of Classification Search
CPC .......... G01S 15/93; G01S 15/87; G01S 7/526; G01S 15/931; G01S 15/876; G01S 7/521;
(Continued)

(56) References Cited

U.S. PATENT DOCUMENTS 6,633,231 B1 * 10/2003 Okamoto ............... G08B 25/08
340/539.11
2007/0061393 A1 * 3/2007 Moore ................. G06F 17/3089
709/201

(Continued)

FOREIGN PATENT DOCUMENTS

JP     H01-272304     10/1989
JP     H08-87693 A     4/1996
(Continued)

*Primary Examiner* — Isam A Alsomiri
*Assistant Examiner* — Amie M Ndure
(74) *Attorney, Agent, or Firm* — Knobbe, Martens, Olson & Bear, LLP (57) ABSTRACT

In a sensor system, a monitoring ECU includes a result-transmission-instruction transmission section that transmits through a signal line a measurement result transmission instruction for transmitting distance data. The result-transmission-instruction transmission section transmits, during a new detection operation, the measurement result transmission instruction to at least one of the ultrasonic sensors engaged in a last detection operation. Upon receipt of the measurement result transmission instruction, a communication section of the ultrasonic sensors transmits a detection result during the new detection operation.

7 Claims, 8 Drawing Sheets

(51) Int. Cl.
*G01S 7/526* (2006.01)
*G01S 15/87* (2006.01)
*G08G 1/16* (2006.01)
*G01S 7/521* (2006.01)

(52) U.S. Cl.
CPC ......... *G01S 7/521* (2013.01); *G01S 2015/938* (2013.01); *G08G 1/16* (2013.01); *H04Q 2209/30* (2013.01)

(58) Field of Classification Search
CPC ................ G01S 2015/938; H04Q 9/00; H04Q 2209/30; G08G 1/16
See application file for complete search history.

(56) References Cited

U.S. PATENT DOCUMENTS

| | | | | |
|---|---|---|---|---|
| 2008/0040151 A1* | 2/2008 | Moore | ................ | G06F 19/322 |
| | | | | 705/2 |
| 2010/0312457 A1 | 12/2010 | Yoshida | | |
| 2013/0291060 A1* | 10/2013 | Moore | ............... | G06F 21/6245 |
| | | | | 726/1 |

FOREIGN PATENT DOCUMENTS

| | | | |
|---|---|---|---|
| JP | 2003-237327 | | 8/2003 |
| JP | 2008-79909 A | | 4/2008 |
| JP | 2010-85277 A | | 4/2010 |
| JP | 2010-230425 A | | 10/2010 |
| JP | 2012083592 A | * | 4/2012 |
| WO | 2015/064061 A1 | | 5/2015 |

\* cited by examiner

| WAVE TRANS/RECEPT INSTRUCTION | MNTR ECU 2→TRANS: SNSR 1b + RECEPT: SNSRS 1a-1c |
|---|---|
| RSLT TRANS INSTRUCTION | MNTR ECU 2→SNSR 1d |
| RESPONSE | SNSR 1d→MNTR ECU 2 |
| WAITING TIME | |
| RSLT TRANS INSTRUCTION | MNTR ECU 2→SNSR 1a |
| RESPONSE | SNSR 1a→MNTR ECU 2 |
| RSLT TRANS INSTRUCTION | MNTR ECU 2→SNSR 1b |
| RESPONSE | SNSR 1b→MNTR ECU 2 |
| RSLT TRANS INSTRUCTION | MNTR ECU 2→SNSR 1c |
| RESPONSE | SNSR 1c→MNTR ECU 2 |
| WAVE TRANS/RECEPT INSTRUCTION | MNTR ECU 2→TRANS: SNSR 1c + RECEPT: SNSRS 1b-1d |
| RSLT TRANS INSTRUCTION | MNTR ECU 2→SNSR 1a |
| RESPONSE | SNSR 1a→MNTR ECU 2 |
| WAITING TIME | |
| RSLT TRANS INSTRUCTION | MNTR ECU 2→SNSR 1b |
| RESPONSE | SNSR 1b→MNTR ECU 2 |
| RSLT TRANS INSTRUCTION | MNTR ECU 2→SNSR 1c |
| RESPONSE | SNSR 1c→MNTR ECU 2 |
| WAVE TRANS/RECEPT INSTRUCTION | MNTR ECU 2→TRANS: SNSRS 1a, 1c + RECEPT: SNSRS 1a-1d |
| WAITING TIME | |
| RSLT TRANS INSTRUCTION | MNTR ECU 2→SNSR 1b |
| RESPONSE | SNSR 1b→MNTR ECU 2 |
| RSLT TRANS INSTRUCTION | MNTR ECU 2→SNSR 1c |
| RESPONSE | SNSR 1c→MNTR ECU 2 |
| RSLT TRANS INSTRUCTION | MNTR ECU 2→SNSR 1d |
| RESPONSE | SNSR 1d→MNTR ECU 2 |

FIG. 5

| WAVE TRANS/RECEPT INSTRUCTION | MNTR ECU 2→TRANS: SNSR 1b + RECEPT: SNSRS 1a-1c |
|---|---|
| | WAITING TIME |
| RSLT TRANS INSTRUCTION | MNTR ECU 2→SNSR 1a |
| RESPONSE | SNSR 1a→MNTR ECU 2 |
| RSLT TRANS INSTRUCTION | MNTR ECU 2→SNSR 1b |
| RESPONSE | SNSR 1b→MNTR ECU 2 |
| RSLT TRANS INSTRUCTION | MNTR ECU 2→SNSR 1c |
| RESPONSE | SNSR 1c→MNTR ECU 2 |
| RSLT TRANS INSTRUCTION | MNTR ECU 2→SNSR 1d |
| RESPONSE | SNSR 1d→MNTR ECU 2 |

FIG. 6

| WAVE TRANS/RECEPT INSTRUCTION | MNTR ECU 2→TRANS: SNSR 1b + RECEPT: SNSRS 1a-1c |
|---|---|
| RSLT TRANS INSTRUCTION | MNTR ECU 2→SNSR 1d |
| RESPONSE | SNSR 1d→MNTR ECU 2 |
| | WAITING TIME |
| RSLT TRANS INSTRUCTION | MNTR ECU 2→SNSR 1a |
| RESPONSE | SNSR 1a→MNTR ECU 2 |
| RSLT TRANS INSTRUCTION | MNTR ECU 2→SNSR 1b |
| RESPONSE | SNSR 1b→MNTR ECU 2 |
| RSLT TRANS INSTRUCTION | MNTR ECU 2→SNSR 1c |
| RESPONSE | SNSR 1c→MNTR ECU 2 |

| WAVE TRANS/RECEPT INSTRUCTION | | MNTR ECU 2→TRANS: SNSR 1b + RECEPT: SNSRS 1a-1c |
|---|---|---|
| WAITING TIME | RSLT TRANS INSTRUCTION | MNTR ECU 2→SNSR 1a |
| | RESPONSE | SNSR 1a→MNTR ECU 2 |
| | RSLT TRANS INSTRUCTION | MNTR ECU 2→SNSR 1b |
| | RESPONSE | SNSR 1b→MNTR ECU 2 |
| | RSLT TRANS INSTRUCTION | MNTR ECU 2→ SNSR 1c |
| | RESPONSE | SNSR 1c→MNTR ECU 2 |
| | RSLT TRANS INSTRUCTION | MNTR ECU 2→SNSR 1d |
| | RESPONSE | SNSR 1d→MNTR ECU 2 |
| WAVE TRANS/RECEPT INSTRUCTION | | MNTR ECU 2→TRANS: SNSR 1c + RECEPT: SNSRS 1b-1d |
| WAITING TIME | RSLT TRANS INSTRUCTION | MNTR ECU 2→SNSR 1a |
| | RESPONSE | SNSR 1a→MNTR ECU 2 |
| | RSLT TRANS INSTRUCTION | MNTR ECU 2→SNSR 1b |
| | RESPONSE | SNSR 1b→MNTR ECU 2 |
| | RSLT TRANS INSTRUCTION | MNTR ECU 2→SNSR 1c |
| | RESPONSE | SNSR 1c→MNTR ECU 2 |
| WAVE TRANS/RECEPT INSTRUCTION | | MNTR ECU 2→TRANS: SNSRS 1a, 1c + RECEPT: SNSRS 1a-1d |
| WAITING TIME | RSLT TRANS INSTRUCTION | MNTR ECU 2→SNSR 1b |
| | RESPONSE | SNSR 1b→MNTR ECU 2 |
| | RSLT TRANS INSTRUCTION | MNTR ECU 2→SNSR 1c |
| | RESPONSE | SNSR 1c→MNTR ECU 2 |
| | RSLT TRANS INSTRUCTION | MNTR ECU 2→SNSR 1d |
| | RESPONSE | SNSR 1d→MNTR ECU 2 |

FIG. 12

| WAITING TIME | WAVE TRANS/RECEPT INSTRUCTION | MNTR ECU 2→TRANS: SNSR 1a + RECEPT: SNSR 1a |
|---|---|---|
| WAITING TIME | RSLT TRANS INSTRUCTION | MNTR ECU 2→SNSR 1d |
| | RESPONSE | SNSR 1d→MNTR ECU 2 |
| | WAVE TRANS/RECEPT INSTRUCTION | MNTR ECU 2→TRANS: SNSR 1d + RECEPT: SNSR 1d |
| WAITING TIME | RSLT TRANS INSTRUCTION | MNTR ECU 2→SNSR 1a |
| | RESPONSE | SNSR 1a→MNTR ECU 2 |

| WAVE TRANS/RECEPT INSTRUCTION | | MNTR ECU 2→TRANS: SNSR 1e + RECEPT: SNSR 1e |
|---|---|---|
| WAITING TIME | RSLT TRANS INSTRUCTION | MNTR ECU 2→SNSR 1e |
| | RESPONSE | SNSR 1e→MNTR ECU 2 |

SENSOR SYSTEM, CONTROL DEVICE, AND SENSOR

CROSS REFERENCE TO RELATED APPLICATION

This application is based on Japanese Patent Application No. 2013-228890 filed on Nov. 4, 2013, the disclosure of which is incorporated herein by reference.

TECHNICAL FIELD

The present disclosure relates to a sensor system that transmits a sensor detection operation instruction and receives a sensor detection result through a signal line for serial communication. The present disclosure also relates to a control device and a sensor that are included in the sensor system.

BACKGROUND ART

A conventionally known sensor system that is used with a vehicle to conduct periphery monitoring includes a plurality of ultrasonic sensors and an ECU (that is, a control device), which are connected with one signal line for serial communication.

The above-mentioned sensor system uses a detection operation instruction frame, which is transmitted from the ECU to the ultrasonic sensors, and a response frame, which is transmitted from the ultrasonic sensors to the ECU. The required number of such frames is determined based on the number of ultrasonic sensors. Additionally, the conventional sensor system causes the ECU to transmit the detection operation instruction frames to the ultrasonic sensors, then wait for a waiting time until the ultrasonic sensors terminate their detection operations, and sequentially receive responses from the ultrasonic sensors after the elapse of the waiting time. This causes a problem in which the intervals (hereinafter referred to as the detection intervals) before the next ultrasonic sensor's detection operation are increased.

As such being the case, a technology for addressing the above problem is disclosed, for instance, in Patent Literature 1. This technology incorporates detection operation instructions for a plurality of ultrasonic sensors into one detection operation instruction frame.

PRIOR ART LITERATURE

Patent Literature

Patent Literature 1: Japanese Patent No. 4826615 B2

SUMMARY OF INVENTION

However, even the technology disclosed in Patent Literature 1 is not capable of incorporating the results of detection by a plurality of ultrasonic sensors into one response frame. Therefore, the detection intervals between the ultrasonic sensors are not significantly reduced depending on the length of data transmitted from the ultrasonic sensors to the ECU.

An object of the present disclosure is to provide a sensor system, a control device, and a sensor that are capable of reducing the detection intervals between ultrasonic sensors.

According to an aspect of the present disclosure, there is provided a sensor system including a plurality of sensors and a control device. The sensors include at least a plurality of ultrasonic sensors. The control device is connected to the sensors through one signal line for serial communication. The control device includes a detection-operation-instruction transmission section that transmits a detection operation instruction to the sensors through the signal line in order to instruct the sensors to perform a detection operation. The sensors each include a detection result transmission section that transmits a detection result of the sensor through the signal line. The control device further includes a result-transmission-instruction transmission section that transmits through the signal line a result transmission instruction to instruct transmission of the detection result. The result-transmission-instruction transmission section transmits the result transmission instruction, during a new detection operation, to at least one of the sensors that previously performed a detection operation. Meanwhile, the detection result transmission section of a sensor that has received the result transmission instruction transmits a detection result during the new detection operation.

Consequently, during the new detection operation of a sensor, the control device can receive the detection result from at least one of the sensors that previously performed a detection operation. Therefore, the detection intervals between the ultrasonic sensors can be reduced by the reception of the detection result during the new detection operation of a sensor.

Further, the control device and sensors according to the present disclosure are used in the above-described sensor system. Therefore, the detection intervals between the ultrasonic sensors can be further reduced.

BRIEF DESCRIPTION OF DRAWINGS

The above and other objects, features, and advantages of the present disclosure will become more apparent from the following detailed description made with reference to the accompanying drawings, in which.

DESCRIPTION OF EMBODIMENTS

Embodiments of the present disclosure will now be described with reference to the accompanying drawings.
(First Embodiment)

Figure 1:
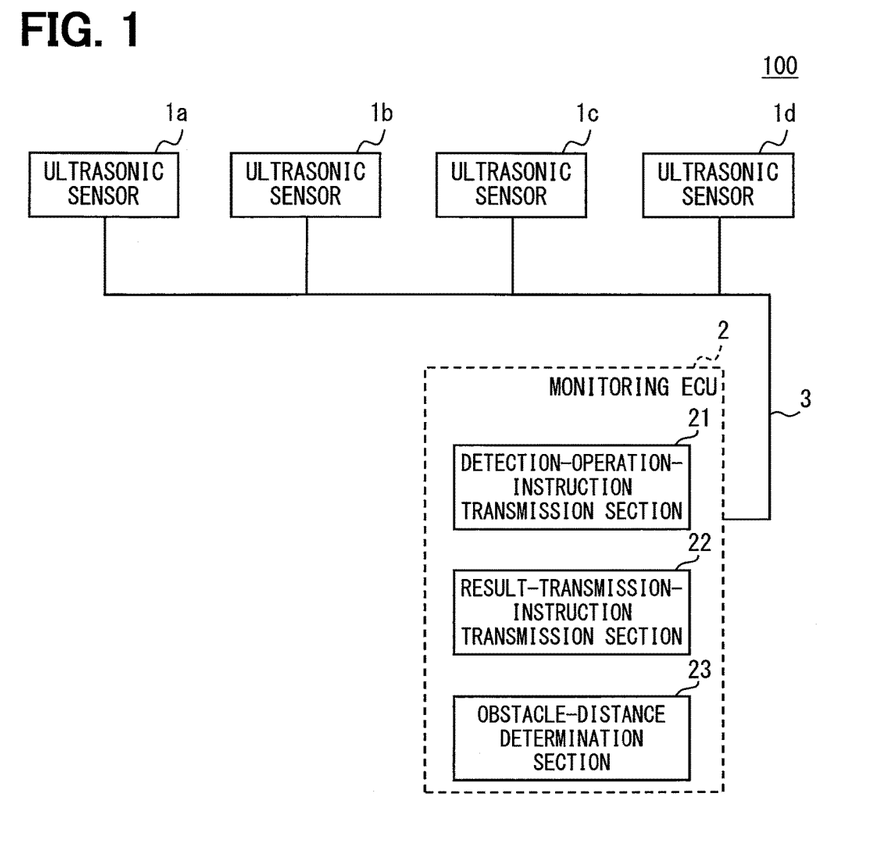
FIG. 1 is a block diagram illustrating an exemplary outline configuration of a sensor system 100 according to a first embodiment.

FIG. 1 is a block diagram illustrating an exemplary outline configuration of a sensor system 100 to which the present disclosure is applied. The sensor system 100 illustrated in FIG. 1 is mounted, for instance, in a vehicle and includes a plurality of ultrasonic sensors 1a-1d and a monitoring ECU 2.

The ultrasonic sensors 1a-1d and the monitoring ECU 2 are, for example, bus-connected through one signal line 3 for serial communication. In other words, the ultrasonic sensors 1a-1d and the monitoring ECU 2 are individually connected through an in-vehicle LAN that is compliant with a communication protocol such as LIN (Local Interconnect Network), which uses a master-slave system. It is assumed, for example, that a data transfer rate of 19.2 kbps is used. It is further assumed that the ultrasonic sensors 1a-1d act as slaves while the monitoring ECU 2 acts as a master. Furthermore, the ultrasonic sensors 1a-1d and the monitoring ECU 2 exchange signals through the signal line 3.

Figure 2:
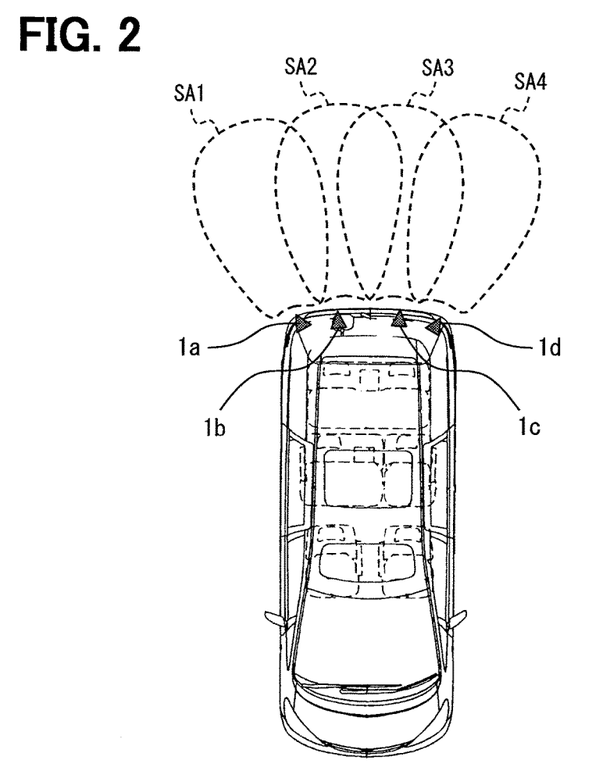
FIG. 2 is a diagram illustrating an example of the installation of ultrasonic sensors 1a-1d.

The ultrasonic sensors 1a-1d are mounted on a rear bumper of the rear of the vehicle as illustrated, for instance, in FIG. 2. The ultrasonic sensors 1a-1d correspond to sensors. For example, from the right corner of the rear of the vehicle to the left corner, the ultrasonic sensor 1a, the ultrasonic sensor 1b, the ultrasonic sensor 1c, and the ultrasonic sensor 1d are sequentially disposed in the order named. The ultrasonic sensors 1a-1d are transmission/reception ultrasonic sensors that transmit an ultrasonic wave and receive the reflection of the transmitted ultrasonic wave in order to detect an obstacle and the distance to the obstacle.

The ultrasonic sensors 1a-1d perform a detection operation upon receipt of a wave transmission/reception instruction from the monitoring ECU 2. The wave transmission/reception instruction corresponds to a detection operation instruction. In a situation where the ultrasonic sensors 1a-1d are not subsequently distinguished from each other, they are referred to as the ultrasonic sensors 1. The ultrasonic sensors 1 each include functional blocks illustrated in FIG. 3, namely, an ultrasonic microphone 11, a wave transmission circuit section 12, a reception circuit section 13, a control-computation circuit section 14, a storage section 15, and a communication section 16.

Figure 3:
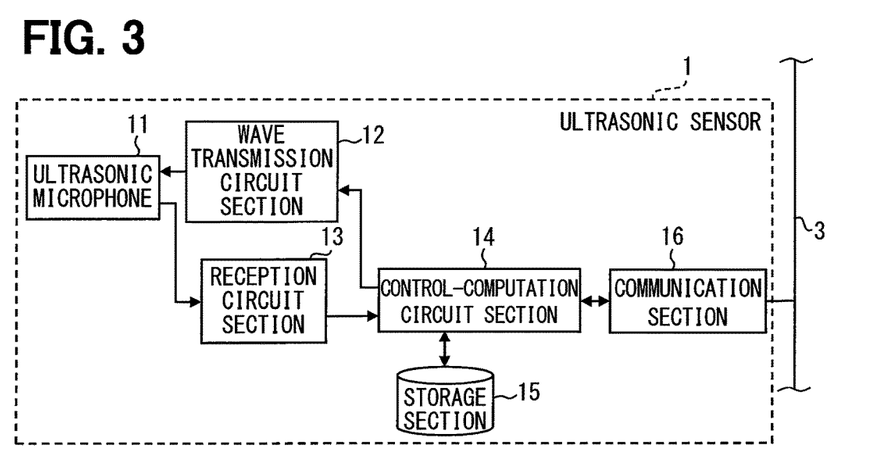
FIG. 3 is a functional block diagram illustrating an exemplary outline configuration of the ultrasonic sensors 1.

When the ultrasonic sensor 1 receives a wave transmission/reception instruction for transmitting a wave, the wave transmission circuit section 12 drives the ultrasonic microphone 11 to transmit an ultrasonic wave in compliance with an instruction from the control-computation circuit section 14. Further, when the ultrasonic sensor 1 receives a wave transmission/reception instruction for receiving a wave and uses the ultrasonic microphone 11 to receive a reflected wave, the reception circuit section 13 amplifies the reflected wave and outputs the amplified reflected wave to the control-computation circuit section 14. The control-computation circuit section 14 computes the distance to an obstacle on the basis of the time lag between the ultrasonic wave transmission and the reflected wave reception, and stores distance data indicative of the result of computation in the storage section 15.

An operation performed by the ultrasonic sensor 1 to transmit an ultrasonic wave and receive the reflection of the transmitted ultrasonic wave in order to detect the distance to an obstacle and store the resulting distance data in the storage section 15 corresponds to the detection operation of the sensor 1. In other words, the ultrasonic wave transmission/reception operation for detection corresponds to the detection operation. It can be said that the detection operation is an operation for detection that does not include an operation conducted to perform computations for a later-described response or establish communication.

Further, when the ultrasonic sensor 1 receives a measurement result transmission instruction from the monitoring ECU 2 through the signal line 3 and the communication section 16, the control-computation circuit section 14 reads the distance data from the storage section 15. The communication section 16 transmits the read distance data to the monitoring ECU 2 through the signal line. The transmitted distance data corresponds to a detection result, and the communication section 16 corresponds to a detection result transmission section. For example, the control-computation circuit section 14 may be formed of a microcomputer or a logic IC, and the storage section 15 may be formed of a RAM, an EEPROM, or other memory built in the control-computation circuit section 14.

The monitoring ECU 2 is mainly formed of a microcomputer that includes, for example, a CPU, a ROM, a RAM, and a backup RAM (these components are not shown). The monitoring ECU 2 performs various processes by executing various control programs stored in the ROM. The monitoring ECU 2 corresponds to a control device. The monitoring ECU 2 includes functional blocks illustrated in FIG. 1, namely, a detection-operation-instruction transmission section 21, a result-transmission-instruction transmission section 22, and an obstacle-distance determination section 23.

The detection-operation-instruction transmission section 21 transmits a wave transmission/reception instruction to the ultrasonic sensors 1 through the signal line 3. The detection-operation-instruction transmission section 21 transmits the wave transmission/reception instruction to the ultrasonic sensors 1 in such a manner that the ultrasonic sensors 1 sequentially transmit an ultrasonic wave at predetermined time intervals defined by a fixed waiting time. The waiting time is a period of time that is required because the ultrasonic sensors 1 engaged in a current detection operation cannot start the next detection operation until the current detection operation is completed. In other words, the waiting time is a period of time during which the ultrasonic sensors 1 are engaged in a detection operation. The waiting time is determined by a desired detection range of the ultrasonic sensors 1. It is assumed that the waiting time is predetermined based on a desired detection range of the ultrasonic sensors 1.

For example, it is assumed in the present embodiment that detection operations are performed in the order described below. Firstly, the ultrasonic sensor 1b transmits an ultrasonic wave. Then, the ultrasonic sensors 1a-1c receive the reflection of the transmitted ultrasonic wave. Secondly, the ultrasonic sensor 1c transmits an ultrasonic wave. Then, the ultrasonic sensors 1b-1d receive the reflection of the transmitted ultrasonic wave. Thirdly, the ultrasonic sensors 1a, 1d transmit an ultrasonic wave. Then, the ultrasonic sensors 1a, 1b receive the reflection of the ultrasonic wave transmitted from the ultrasonic sensor 1a, and the ultrasonic sensors 1c, 1d receive the reflection of the ultrasonic wave transmitted from the ultrasonic sensor 1d. The first to third detection operations are regarded as one set and repeated a number of times. It is assumed that the above-described order of detection operations is preset in a program for the monitoring ECU 2.

The detection-operation-instruction transmission section 21 transmits a wave transmission/reception instruction to the ultrasonic sensors 1 in such a manner that the detection operations are performed in the order described above. More specifically, firstly, the detection-operation-instruction transmission section 21 transmits a wave transmission/reception instruction in such a manner as to instruct the ultrasonic sensor 1b to transmit an ultrasonic wave and receive the reflection of the transmitted ultrasonic wave and instruct the ultrasonic sensors 1a, 1c to receive the reflection of the transmitted ultrasonic wave. Secondly, the detection-operation-instruction transmission section 21 transmits a wave transmission/reception instruction in such a manner as to instruct the ultrasonic sensor 1c to transmit an ultrasonic wave and receive the reflection of the transmitted ultrasonic wave and instruct the ultrasonic sensors 1b, 1d to receive the reflection of the transmitted ultrasonic wave. Thirdly, the detection-operation-instruction transmission section 21 transmits a wave transmission/reception instruction in such a manner as to instruct the ultrasonic sensors 1a, 1d to transmit an ultrasonic wave and receive the reflection of the transmitted ultrasonic wave and instruct the ultrasonic sensors 1b, 1c to receive the reflection of the transmitted ultrasonic wave.

The above-described order of detection operations is a mere example. Obviously, the order of detection operations is not limited to the above. Further, as regards wave transmission/reception signals to be transmitted from the detection-operation-instruction transmission section 21 to the ultrasonic sensors 1 through the signal line, the wave transmission/reception instructions to the ultrasonic sensors 1 should preferably be integrated into a single frame as disclosed in Patent Literature 1. The reason is that the detection intervals between the ultrasonic sensors 1 can be further decreased as compared to a configuration in which separate frames are used to transmit the wave transmission/reception instructions to the ultrasonic sensors 1.

The result-transmission-instruction transmission section 22 transmits a measurement result transmission instruction to the ultrasonic sensors 1 through the signal line 3. The measurement result transmission instruction is an instruction for transmitting distance data that is stored in the storage section 15 as a result of detection operations of the ultrasonic sensors 1. The measurement result transmission instruction corresponds to a result transmission instruction.

During a current detection operation (hereinafter referred to as a new detection operation) of an ultrasonic sensor 1, the result-transmission-instruction transmission section 22 transmits a measurement result transmission instruction to one ultrasonic sensor 1 that was previously performing a detection operation. More preferably, during a new detection operation of an ultrasonic sensor 1, if there is any ultrasonic sensor 1 that is not currently performing a new detection operation, the measurement result transmission instruction is transmitted to an ultrasonic sensor 1 that is not currently performing a new detection operation but performed a detection operation last time. The communication section 16 of the ultrasonic sensor 1 that has received the measurement result transmission instruction makes a response by reading distance data from the storage section 15 during the new detection operation and transmitting the read distance data to the monitoring ECU 2.

The present embodiment will be described with reference to a case where, during a new detection operation of an ultrasonic sensor 1, the measurement result transmission instruction is transmitted to an ultrasonic sensor 1 that is not currently performing a new detection operation but previously performed a detection operation. This configuration is at an advantage in that it can be implemented more easily, because there is no need to devise a special scheme for permitting an ultrasonic sensor 1 currently engaged in a new detection operation to read and transmit distance data.

An ultrasonic sensor 1 currently engaged in a detection operation and an ultrasonic sensor currently unengaged in a detection operation are predetermined based on the aforementioned order of detection operations. Therefore, a program for the monitoring ECU 2 should be preset in such a manner that the result-transmission-instruction transmission section 22 transmits a measurement result transmission instruction to an ultrasonic sensor 1 that is not currently performing a new detection operation but previously performed a detection operation. An ultrasonic sensor 1 currently unengaged in a detection operation corresponds to a no-detection operation sensor.

Figure 4:
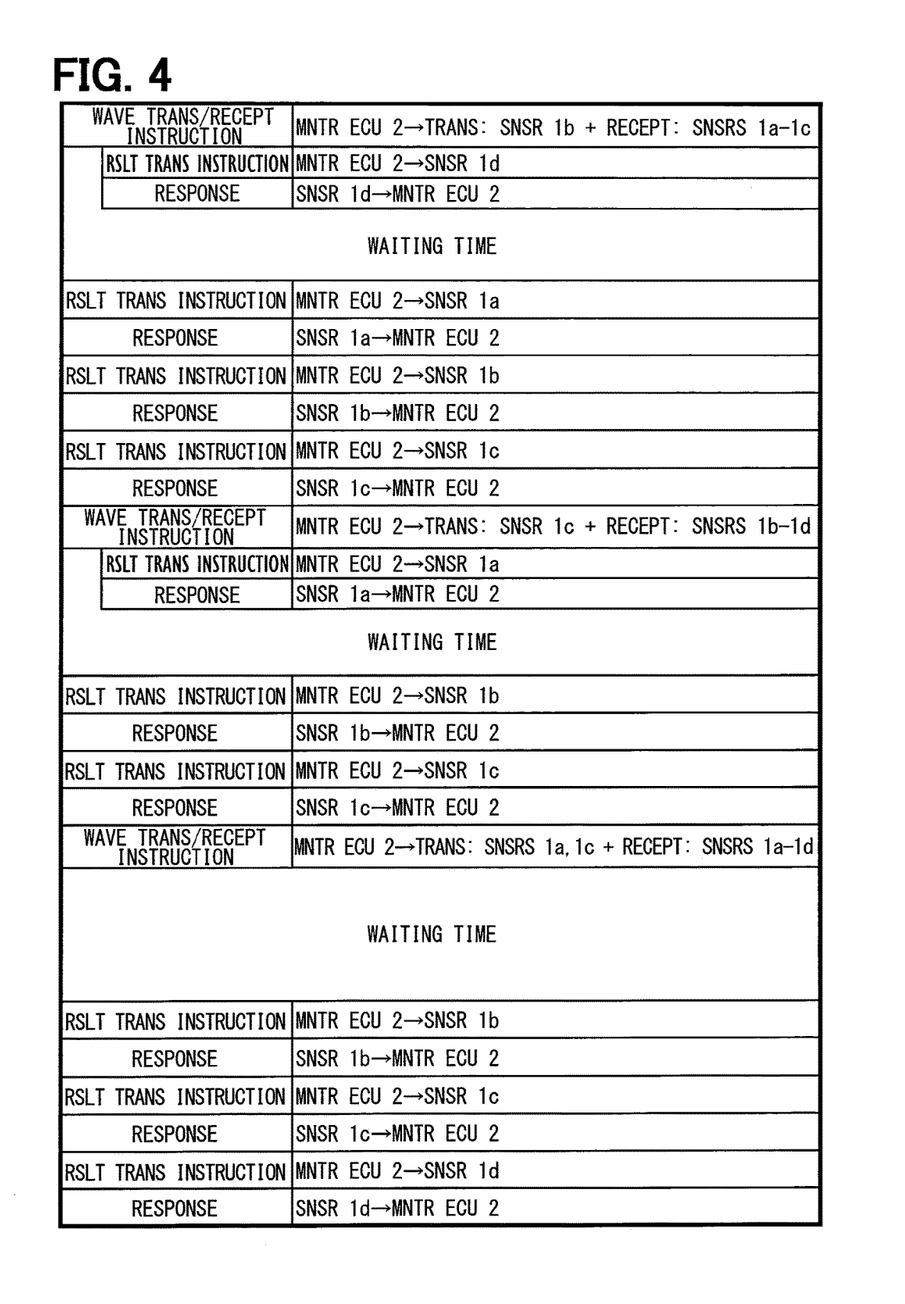
FIG. 4 is a diagram illustrating an exemplary sequence of events in the sensor system 100 according to the first embodiment between a wave transmission/reception instruction transmission from a monitoring ECU 2 and a response from the ultrasonic sensors 1.

A sequence of events in the sensor system 100 between a wave transmission/reception instruction transmission from the monitoring ECU 2 and a response from the ultrasonic sensors 1 will now be described with reference to FIG. 4. In the example of FIG. 4, it is assumed, for the sake of convenience, that one set of the aforementioned first to third detection operations is completed.

As illustrated in FIG. 4, first of all, the monitoring ECU 2 starts a first detection operation by transmitting a wave transmission/reception instruction that instructs the ultrasonic sensor 1b to transmit an ultrasonic wave and receive the reflection of the transmitted ultrasonic wave and instructs the ultrasonic sensors 1a, 1c to receive the reflection.

During a waiting time for the first detection operation, the monitoring ECU 2 transmits a measurement result transmission instruction to the ultrasonic sensor 1d, which is one of the ultrasonic sensors 1 previously engaged in the third detection operation and is currently unengaged in a new detection operation. Upon receipt of the measurement result transmission instruction, the ultrasonic sensor 1d makes a response by reading distance data stored in the storage section 15 and transmitting the read distance data to the monitoring ECU 2.

After the elapse of the waiting time for the first detection operation, the measurement result transmission instruction is transmitted to the ultrasonic sensor 1a, which is one of the ultrasonic sensors 1 previously engaged in the third detection operation and is currently engaged in a new detection operation. Upon receipt of the measurement result transmission instruction, the ultrasonic sensor 1a makes a response by reading distance data stored in the storage section 15 and transmitting the read distance data to the monitoring ECU 2.

Next, the measurement result transmission instruction is also transmitted to the ultrasonic sensor 1b, which is one of the ultrasonic sensors 1 previously engaged in the third detection operation and is currently engaged in a new detection operation. Upon receipt of the measurement result transmission instruction, the ultrasonic sensor $1b$ makes a response by reading distance data stored in the storage section 15 and transmitting the read distance data to the monitoring ECU 2.

Additionally, the measurement result transmission instruction is also transmitted to the ultrasonic sensor $1c$, which is one of the ultrasonic sensors 1 previously engaged in the third detection operation and is currently engaged in a new detection operation. Upon receipt of the measurement result transmission instruction, the ultrasonic sensor $1c$ makes a response by reading distance data stored in the storage section 15 and transmitting the read distance data to the monitoring ECU 2.

Subsequently, the monitoring ECU 2 starts a second detection operation by transmitting a wave transmission/reception instruction that instructs the ultrasonic sensor $1c$ to transmit an ultrasonic wave and receive the reflection of the transmitted ultrasonic wave and instructs the ultrasonic sensors $1b$, $1d$ to receive the reflection.

During a waiting time for the second detection operation, the monitoring ECU 2 transmits a measurement result transmission instruction to the ultrasonic sensor $1a$, which is one of the ultrasonic sensors 1 previously engaged in the first detection operation and is currently unengaged in a new detection operation. Upon receipt of the measurement result transmission instruction, the ultrasonic sensor $1a$ makes a response by reading distance data stored in the storage section 15 and transmitting the read distance data to the monitoring ECU 2.

After the elapse of the waiting time for the second detection operation, the measurement result transmission instruction is transmitted to the ultrasonic sensor $1b$, which is one of the ultrasonic sensors 1 previously engaged in the first detection operation and is currently engaged in a new detection operation. Upon receipt of the measurement result transmission instruction, the ultrasonic sensor $1b$ makes a response by reading distance data stored in the storage section 15 and transmitting the read distance data to the monitoring ECU 2.

Next, the measurement result transmission instruction is also transmitted to the ultrasonic sensor $1c$, which is one of the ultrasonic sensors 1 previously engaged in the first detection operation and is currently engaged in a new detection operation. Upon receipt of the measurement result transmission instruction, the ultrasonic sensor $1c$ makes a response by reading distance data stored in the storage section 15 and transmitting the read distance data to the monitoring ECU 2.

Subsequently, the monitoring ECU 2 starts a third detection operation by transmitting a wave transmission/reception instruction that instructs the ultrasonic sensors $1a$, $1d$ to transmit an ultrasonic wave and receive the reflection of the transmitted ultrasonic wave and instructs the ultrasonic sensors $1b$, $1c$ to receive the reflection.

The measurement result transmission instruction is not transmitted during a waiting time for the third detection operation because all the ultrasonic sensors 1 previously engaged in the second detection operation are currently not engaged in a new detection operation.

After the elapse of the waiting time for the third detection operation, the measurement result transmission instruction is transmitted to the ultrasonic sensor $1b$, which is one of the ultrasonic sensors 1 previously engaged in the second detection operation and is currently engaged in a new detection operation. Upon receipt of the measurement result transmission instruction, the ultrasonic sensor $1b$ makes a response by reading distance data stored in the storage section 15 and transmitting the read distance data to the monitoring ECU 2.

Next, the measurement result transmission instruction is also transmitted to the ultrasonic sensor $1c$, which is one of the ultrasonic sensors 1 previously engaged in the second detection operation and is currently engaged in a new detection operation. Upon receipt of the measurement result transmission instruction, the ultrasonic sensor $1c$ makes a response by reading distance data stored in the storage section 15 and transmitting the read distance data to the monitoring ECU 2.

Additionally, the measurement result transmission instruction is also transmitted to the ultrasonic sensor $1d$, which is one of the ultrasonic sensors 1 previously engaged in the second detection operation and is currently engaged in a new detection operation. Upon receipt of the measurement result transmission instruction, the ultrasonic sensor $1d$ makes a response by reading distance data stored in the storage section 15 and transmitting the read distance data to the monitoring ECU 2.

Returning to FIG. 1, the obstacle-distance determination section 23 uses a well-known calculation method to calculate the minimum distance between a host vehicle and an obstacle on the basis of the distance data transmitted from the communication section 16 of each of the ultrasonic sensors 1 and spacing intervals between the ultrasonic sensors 1. The obstacle-distance determination section 23 then determines the calculated minimum distance as the distance between the host vehicle and the obstacle. The determined distance between the host vehicle and the obstacle may be used, for instance, to provide driving assistance by reporting the presence of an obstacle.

Operational advantages of the configuration of the first embodiment will now be described in detail with reference to FIGS. 5 and 6. For the sake of convenience, FIGS. 5 and 6 are prepared to describe a period during which the first detection operation is being performed subsequently to the third detection operation.

Figure 5:
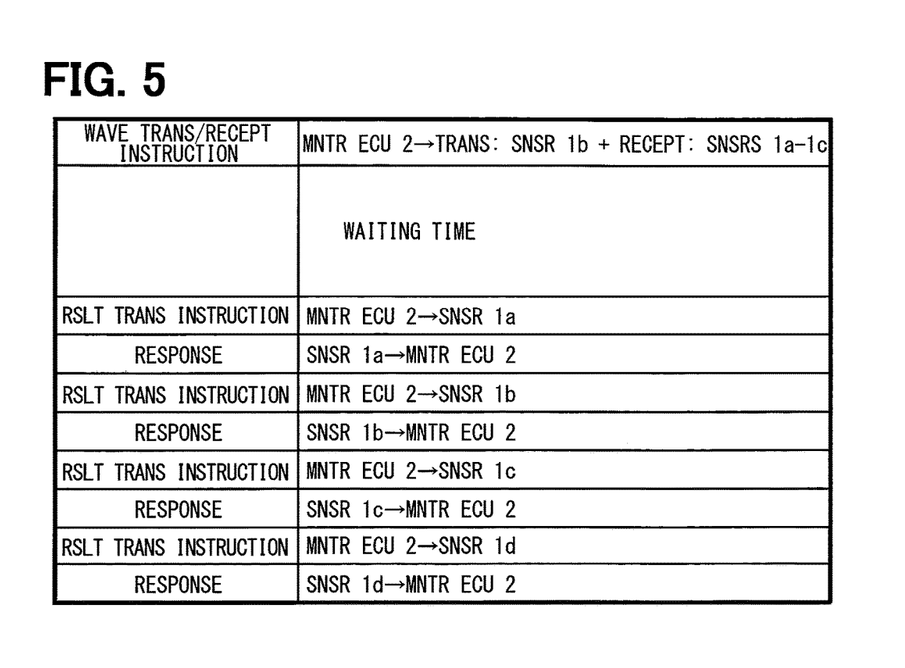
FIG. 5 is a diagram illustrating operational advantages of a configuration of the first embodiment.
Figure 6:
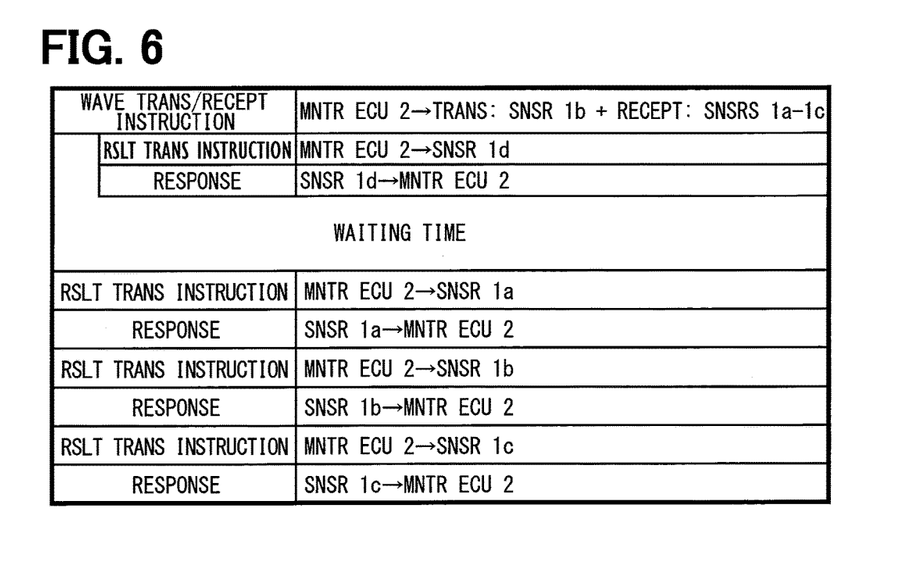
FIG. 6 is a diagram illustrating operational advantages of a configuration of the first embodiment.

As illustrated in FIG. 5, conventional technologies inhibit the monitoring ECU 2 from transmitting a measurement result transmission instruction to the ultrasonic sensors 1 and the ultrasonic sensors 1 from responding to the monitoring ECU 2 during a detection operation. Meanwhile, as illustrated in FIG. 6, the configuration of the first embodiment causes the monitoring ECU 2 during the first detection operation to transmit a measurement result transmission instruction to the ultrasonic sensor $1d$, which is one of the ultrasonic sensors 1 previously engaged in the third detection operation and is currently unengaged in a detection operation. Additionally, upon receipt of the measurement result transmission instruction, the ultrasonic sensor $1d$ makes a response by transmitting distance data to the monitoring ECU 2 during the first detection operation.

As described above, during a new detection operation of an ultrasonic sensor 1, the configuration of the first embodiment enables the monitoring ECU 2 to receive distance data (that is, a detection result) from an ultrasonic sensor 1 that previously performed a detection operation. Therefore, the detection intervals required for one set of detection operations of an ultrasonic sensor 1 can be reduced by receiving the detection result during the new detection operation of an ultrasonic sensor 1.

The configuration of the first embodiment establishes communication during a detection operation of an ultrasonic sensor 1. It is therefore possible that the detection operation may be affected by communication noise. As such being the case, it is preferred that the ultrasonic sensors 1 be configured as described below.

Figure 7:
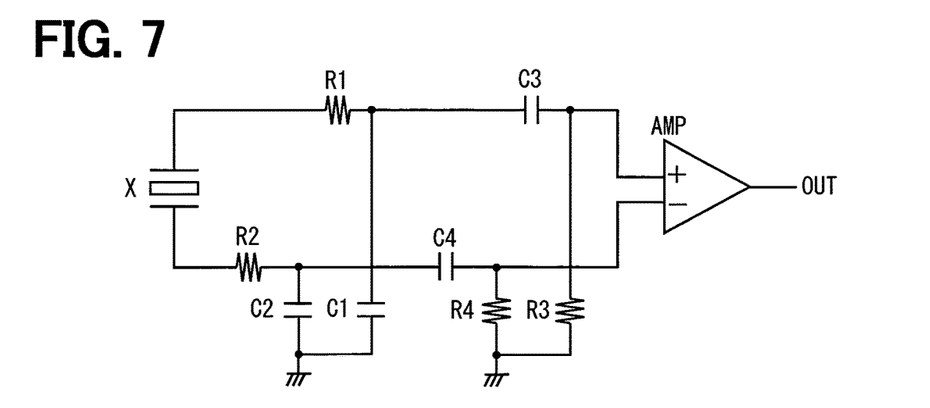
FIG. 7 is an electrical circuit diagram illustrating an exemplary configuration of a reception circuit section 13.
Figure 8:
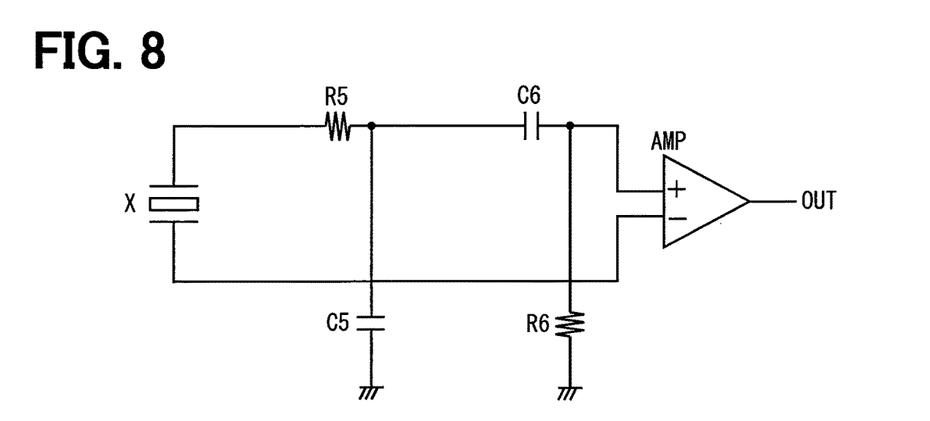
FIG. 8 is an electrical circuit diagram illustrating an exemplary configuration of the reception circuit section 13.

Firstly, the reception circuit section 13, which amplifies the signal of a reflected wave received by the ultrasonic microphone 11 and outputs the amplified signal to the control-computation circuit section 14, is preferably formed of a differential amplifier circuit that has a low-pass filter (hereinafter referred to as the LPF) and a high-pass filter (hereinafter referred to as the HPF) at an input to an operational amplifier as illustrated in FIGS. 7 and 8. The ultrasonic microphone 11 corresponds to a sensor element, the control-computation circuit section 14 corresponds to a computation circuit, and the reception circuit section 13 corresponds to a differential amplifier circuit.

For the sake of convenience, FIGS. 7 and 8 illustrate only the ultrasonic microphone 11 and the reception circuit section 13. The symbols R1 to R4 in FIG. 7 and the symbols R5 and R6 in FIG. 8 each represent a resistor. The symbols C1 to C4 in FIG. 7 and the symbols C5 and C6 in FIG. 8 each represent a capacitor. The symbol AMP in FIGS. 7 and 8 represents an operational amplifier. The configurations illustrated in FIGS. 7 and 8 are capable of reducing the influence of communication noise upon the ultrasonic microphone 11 by using a differential amplifier circuit.

Figure 9:
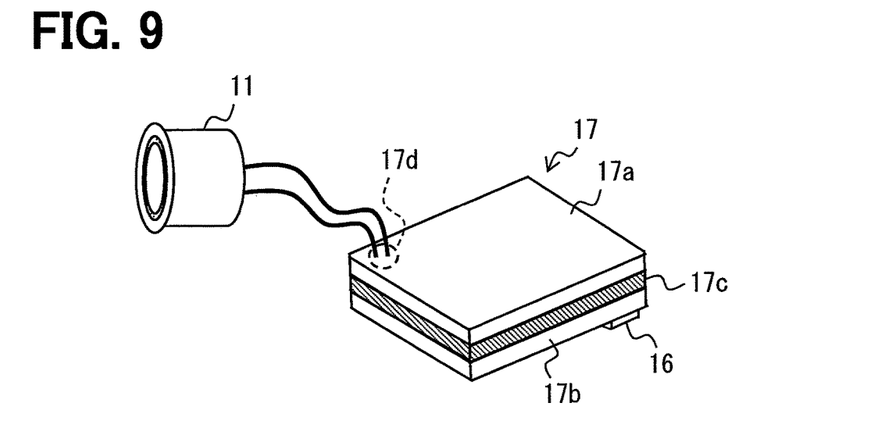
FIG. 9 is a diagram illustrating an exemplary configuration of the ultrasonic sensors 1 that reduce the influence of noise generated during communication provided by a communication section 16.

Secondly, a configuration illustrated, for instance, in FIG. 9 is preferably employed. The reference numeral 17 in FIG. 9 denotes a multilayer substrate. The multilayer substrate 17 includes a first substrate 17a, a second substrate 17b, and a ground layer 17c. The first substrate 17a includes the wave transmission circuit section 12, the reception circuit section 13, and the control-computation circuit section 14. The second substrate 17b includes the communication section 16. The ground layer 17c is sandwiched between the first substrate 17a and the second substrate 17b. The storage section 15 may be mounted, for example, on the second substrate 17b or on the first substrate 17a. As an example, the wave transmission circuit section 12, the reception circuit section 13, the control-computation circuit section 14, and the storage section 15 may be formed on the first substrate 17a as an IC chip.

The ultrasonic microphone 11 is electrically connected to the reception circuit section 13 and to the control-computation circuit section 14 through a connection section 17d on the first substrate 17a. Further, as an example, the ultrasonic microphone 11 is disposed apart from the multilayer substrate 17 as illustrated in FIG. 9. The control-computation circuit section 14 on the first substrate 17a and the communication section 16 on the second substrate 17b are electrically connected via a through-hole.

According to the above-described configuration, the ground layer 17c disposed between the first substrate 17a on which the connection section 17d for the ultrasonic microphone 11 is situated and the second substrate 17b on which the communication section 16 is situated. Therefore, the ground layer 17c reduces the influence of communication noise of the communication section 16 upon the ultrasonic microphone 11.

Further, it is preferred that the connection section 17d on the first substrate 17a and the communication section 16 on the second substrate 17b be positioned apart from each other in a planar direction of the multilayer substrate 17. If, for example, the multilayer substrate 17 is shaped like a rectangular plate, it is preferred that the connection section 17d on the first substrate 17a and the communication section 16 on the second substrate 17b be positioned at diagonally opposite ends in the planar direction of the multilayer substrate 17 as illustrated in FIG. 9.

According to the above-described configuration, the distance between the communication section 16 and the connection section 17d can be increased. This reduces the influence of communication noise of the communication section 16 upon the ultrasonic microphone 11.

The first embodiment has been described on the assumption that the sensor system 100 includes a plurality of sensors, all of which are ultrasonic sensors 1. However, the first embodiment is not limited to such a configuration. For example, an alternative configuration may be employed so that a sensor other than the ultrasonic sensors 1 is also connected to the signal line 3 for serial communication (a modification based on this alternative configuration is hereinafter referred to as the first modification).

Figure 10:
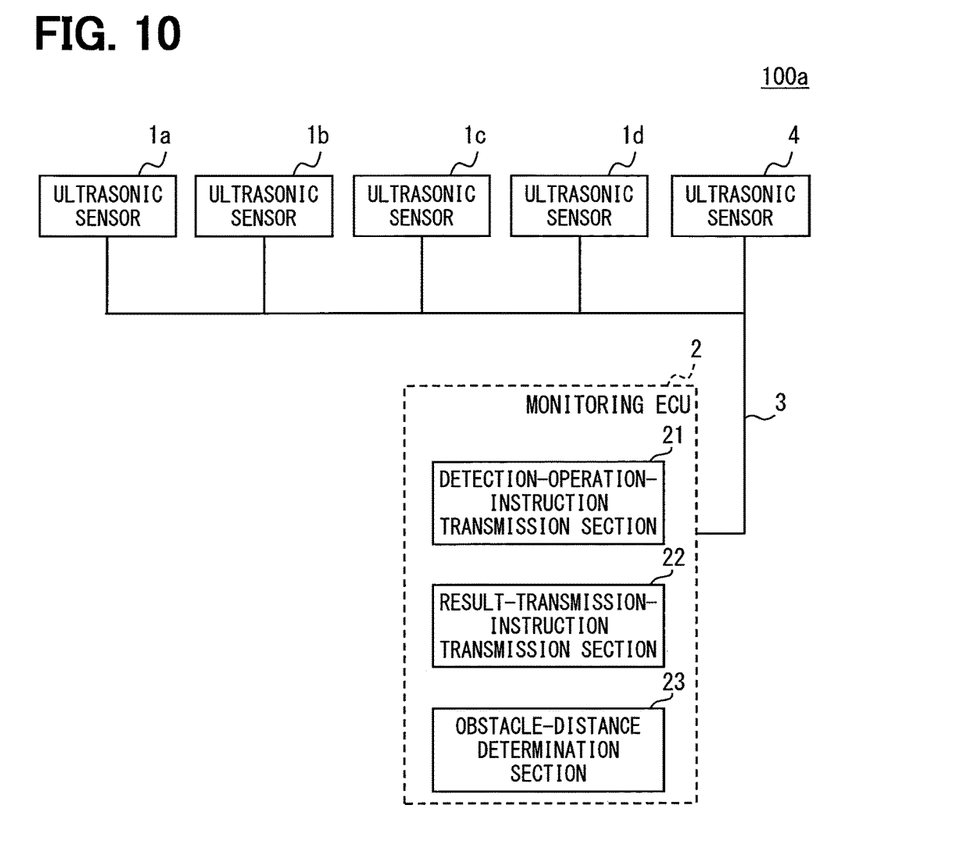
FIG. 10 is a block diagram illustrating an exemplary outline configuration of a sensor system 100a according to a second modification.

The first modification may use an alternative configuration in which a sensor system 100a includes the monitoring ECU 2, the ultrasonic sensors 1, and a temperature sensor 4, which are connected to the single signal line 3 for serial communication, as illustrated in FIG. 10. In this instance, the first modification may transmit a measurement result transmission instruction from the monitoring ECU 2 to the temperature sensor 4 and receive a detection result from the temperature sensor 4 during detection operations of the ultrasonic sensors 1. Further, the first modification may use another alternative configuration that transmits a measurement result transmission instruction from the monitoring ECU 2 to the ultrasonic sensors 1 and receives a detection result from the ultrasonic sensors 1 during detection operations of the temperature sensor 4. The temperature sensor 4 corresponds to a sensor.

(Second Embodiment)

While the present disclosure has been described in conjunction with the foregoing embodiment, the present disclosure is not limited to the foregoing embodiment. A second embodiment, which will be described subsequently, is also included in the technical scope of the present disclosure. The second embodiment will now be described with reference to the accompanying drawings. For convenience of explanation, members having the same functions as those depicted in the drawings used to describe the first embodiment are designated by the same reference numerals as their counterparts and will not be redundantly described.

The sensor system 100 according to the second embodiment is similar to the sensor system 100 according to the first embodiment except that the former is partly different from the latter in the process performed by the result-transmission-instruction transmission section 22 of the monitoring ECU 2 and in the process performed by the communication section 16 of each ultrasonic sensor 1.

Figure 11:
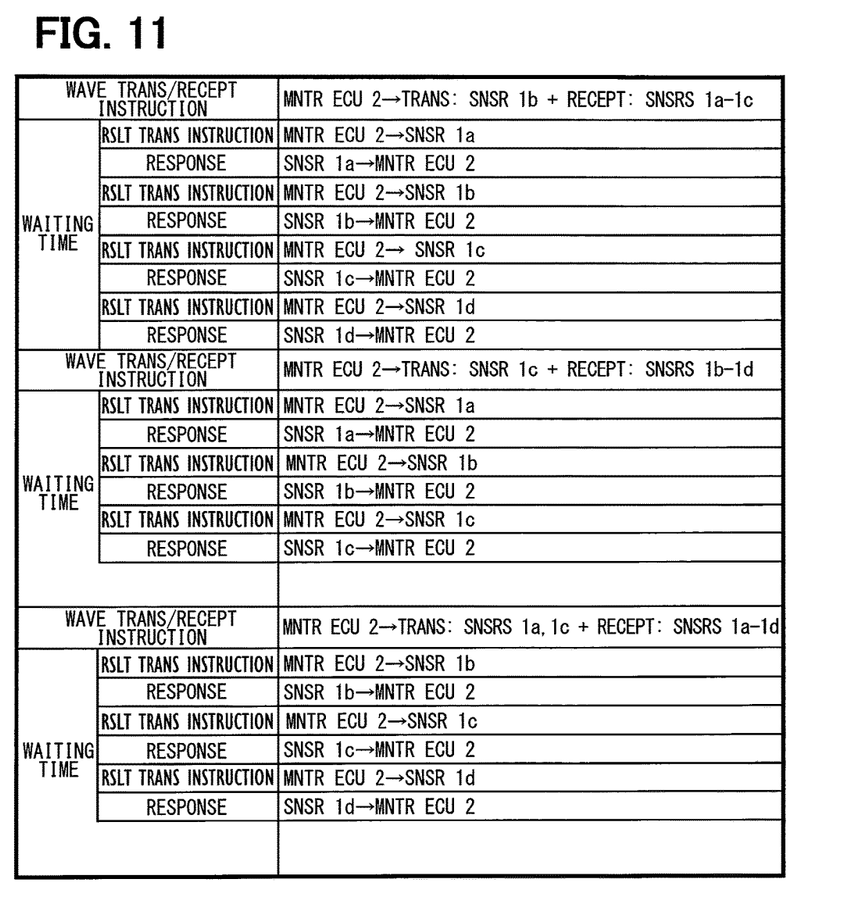
FIG. 11 is a diagram illustrating an exemplary sequence of events in the sensor system 100 according to a second embodiment between a wave transmission/reception instruction transmission from the monitoring ECU 2 and a response from the ultrasonic sensors 1.

A sequence of events in the sensor system 100 according to the second embodiment between a wave transmission/reception instruction transmission from the monitoring ECU 2 and a response from the ultrasonic sensors 1 will now be described with reference to FIG. 11. In the example of FIG. 11, it is assumed, for the sake of convenience, that one set of the first to third detection operations described in conjunction with the first embodiment is completed.

As illustrated in FIG. 11, first of all, the monitoring ECU 2 starts a first detection operation by transmitting a wave transmission/reception instruction that instructs the ultrasonic sensor 1b to transmit an ultrasonic wave and receive the reflection of the transmitted ultrasonic wave and instructs the ultrasonic sensors 1a, 1c to receive the reflection.

During a waiting time for the first detection operation, the monitoring ECU 2 sequentially transmits a measurement result transmission instruction to all ultrasonic sensors 1 previously engaged in the third detection operation no matter whether they are currently engaged in a new detection operation. Upon receipt of the measurement result transmission instruction, the ultrasonic sensors 1 each make a response by reading distance data stored in the storage section 15 and transmitting the read distance data to the monitoring ECU 2.

As illustrated in FIG. 11, in the example of the second embodiment, first of all, the monitoring ECU 2 transmits a measurement result transmission instruction to the ultrasonic sensor 1a, and upon receipt of the measurement result transmission instruction, the ultrasonic sensor 1a makes a response. Next, the monitoring ECU 2 transmits a measurement result transmission instruction to the ultrasonic sensor 1b, and then the ultrasonic sensor 1b makes a response. Next, the monitoring ECU 2 transmits a measurement result transmission instruction to the ultrasonic sensor 1c, and then the ultrasonic sensor 1c makes a response. Next, the monitoring ECU 2 transmits a measurement result transmission instruction to the ultrasonic sensor 1d, and then the ultrasonic sensor 1d makes a response.

Subsequently, the monitoring ECU 2 starts a second detection operation by transmitting a wave transmission/reception instruction that instructs the ultrasonic sensor 1c to transmit an ultrasonic wave and receive the reflection of the transmitted ultrasonic wave and instructs the ultrasonic sensors 1b, 1d to receive the reflection.

During a waiting time for the second detection operation, the monitoring ECU 2 sequentially transmits a measurement result transmission instruction to all ultrasonic sensors 1 previously engaged in the first detection operation no matter whether they are currently engaged in a new detection operation. Upon receipt of the measurement result transmission instruction, the ultrasonic sensors 1 each make a response by reading distance data stored in the storage section 15 and transmitting the read distance data to the monitoring ECU 2.

As illustrated in FIG. 11, in the example of the second embodiment, first of all, the monitoring ECU 2 transmits a measurement result transmission instruction to the ultrasonic sensor 1a, and upon receipt of the measurement result transmission instruction, the ultrasonic sensor 1a makes a response. Next, the monitoring ECU 2 transmits a measurement result transmission instruction to the ultrasonic sensor 1b, and then the ultrasonic sensor 1b makes a response. Next, the monitoring ECU 2 transmits a measurement result transmission instruction to the ultrasonic sensor 1c, and then the ultrasonic sensor 1c makes a response.

Subsequently, the monitoring ECU 2 starts a third detection operation by transmitting a wave transmission/reception instruction that instructs the ultrasonic sensors 1a, 1d to transmit an ultrasonic wave and receive the reflection of the transmitted ultrasonic wave and instructs the ultrasonic sensors 1b, 1c to receive the reflection.

During a waiting time for the third detection operation, the monitoring ECU 2 sequentially transmits a measurement result transmission instruction to all ultrasonic sensors 1 previously engaged in the second detection operation no matter whether they are currently engaged in a new detection operation. Upon receipt of the measurement result transmission instruction, the ultrasonic sensors 1 each make a response by reading distance data stored in the storage section 15 and transmitting the read distance data to the monitoring ECU 2.

As illustrated in FIG. 11, in the example of the second embodiment, first of all, the monitoring ECU 2 transmits a measurement result transmission instruction to the ultrasonic sensor 1b, and upon receipt of the measurement result transmission instruction, the ultrasonic sensor 1b makes a response. Next, the monitoring ECU 2 transmits a measurement result transmission instruction to the ultrasonic sensor 1c, and then the ultrasonic sensor 1c makes a response. Next, the monitoring ECU 2 transmits a measurement result transmission instruction to the ultrasonic sensor 1d, and then the ultrasonic sensor 1d makes a response.

In the second embodiment, during a new detection operation, a response to the measurement result transmission instruction is received from all the ultrasonic sensors 1 engaged in a last detection operation. This configuration may be implemented, for instance, by using a control-computation circuit section 14 having a high processing capability for each ultrasonic sensor 1 and providing the storage section 15 of each ultrasonic sensor 1 with a memory area for storing distance data obtained from a previous detection operation and a memory area for storing distance data obtained from a new detection operation. An alternative configuration may be implemented by using a control-computation circuit section 14 having such a high processing capability for each ultrasonic sensor 1 as to read distance data obtained from a previous detection operation before it is overwritten by distance data obtained from a new detection operation.

During a new detection operation of an ultrasonic sensor 1, the configuration of the second embodiment enables the monitoring ECU 2 to receive distance data (that is, a detection result) from all ultrasonic sensors 1 that previously performed a detection operation. Therefore, the detection intervals required for one set of detection operations of an ultrasonic sensor 1 can be made shorter than when the configuration of the first embodiment is employed.

Further, the configuration of the first embodiment has a smaller effect of reducing the detection intervals than the configuration of the second embodiment. However, the configuration of the first embodiment is at an advantage in that it reduces the detection intervals even when the control-computation circuit section 14 of each ultrasonic sensor 1 does not have a high processing capability.

Moreover, when the sensor system 100 uses two ultrasonic sensors 1 as the sensors, an alternative configuration described below may be used (a modification based on this alternative configuration is hereinafter referred to as the second modification). For the sake of convenience, the second modification will be described on the assumption that one of the two ultrasonic sensors is referred to as the ultrasonic sensor 1a while the other one is referred to as the ultrasonic sensor 1d.

In the second modification, the detection-operation-instruction transmission section 21 transmits a wave transmission/reception instruction to an ultrasonic sensor 1 currently unengaged in a detection operation while the other ultrasonic sensor 1 is engaged in a new detection operation.

Figure 12:
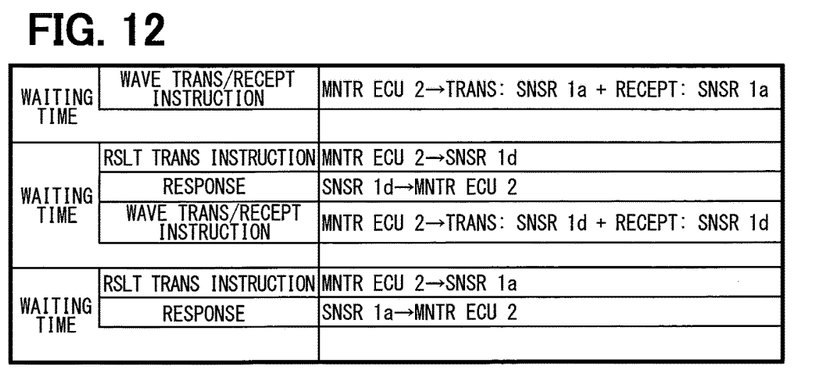
FIG. 12 is a diagram illustrating an exemplary sequence of events in the sensor system 100 according to the second modification between a wave transmission/reception instruction transmission from the monitoring ECU 2 and a response from the ultrasonic sensors 1.

A sequence of events in the sensor system 100 according to the second modification between a wave transmission/reception instruction transmission from the monitoring ECU 2 and a response from the ultrasonic sensors 1 will now be described with reference to FIG. 12. In the example of FIG. 12, it is assumed, for the sake of convenience, that a detection operation is completed by allowing the ultrasonic sensor 1d to transmit an ultrasonic wave and receive the reflection of the transmitted ultrasonic wave.

As illustrated in FIG. 12, first of all, the monitoring ECU 2 starts a detection operation of the ultrasonic sensor 1a during a waiting time for a detection operation of the ultrasonic sensor 1d by transmitting a wave transmission/reception instruction that instructs the ultrasonic sensor 1a to transmit an ultrasonic wave and receive the reflection of the transmitted ultrasonic wave.

During a waiting time for the detection operation of the ultrasonic sensor 1a, the monitoring ECU 2 transmits a measurement result transmission instruction to the ultrasonic sensor 1d, which was engaged in a last detection operation. Upon receipt of the measurement result transmission instruction, the ultrasonic sensor 1d makes a response by reading distance data stored in the storage section 15 and transmitting the read distance data to the monitoring ECU 2.

Subsequently, the monitoring ECU 2 starts a detection operation of the ultrasonic sensor 1d during a waiting time for the detection operation of the ultrasonic sensor 1a by transmitting a wave transmission/reception instruction that instructs the ultrasonic sensor 1d to transmit an ultrasonic wave and receive the reflection of the transmitted ultrasonic wave.

During a waiting time for the detection operation of the ultrasonic sensor 1d, the monitoring ECU 2 transmits a measurement result transmission instruction to the ultrasonic sensor 1a, which was engaged in a last detection operation. Upon receipt of the measurement result transmission instruction, the ultrasonic sensor 1a makes a response by reading distance data stored in the storage section 15 and transmitting the read distance data to the monitoring ECU 2.

During a new detection operation of an ultrasonic sensor 1, the configuration of the second modification transmits a wave transmission/reception instruction to an ultrasonic sensor 1 that will subsequently perform a detection operation. This makes it possible to further reduce the detection intervals required for one set of detection operations of an ultrasonic sensor 1.

The second modification has been described on the assumption that two ultrasonic sensors 1 are used as the sensors. However, an alternative configuration may be employed so that sensors other than ultrasonic sensors 1 are used as the two sensors.

Further, the first and second embodiments have been described on the assumption that a bus network topology is employed for the sensor system 100. However, the network topology for the sensor system 100 is not limited to the bus network topology. For example, an alternative is to employ a daisy chain network topology or other network topology.

(Third Embodiment)

The present disclosure is not limited to the first and second embodiments, which have been described above. A third embodiment, which will be described subsequently, is also included in the technical scope of the present disclosure. The third embodiment will now be described with reference to the accompanying drawings. For convenience of explanation, members having the same functions as those depicted in the drawings used to describe the first embodiment are designated by the same reference numerals as their counterparts and will not be redundantly described.

Figure 13:
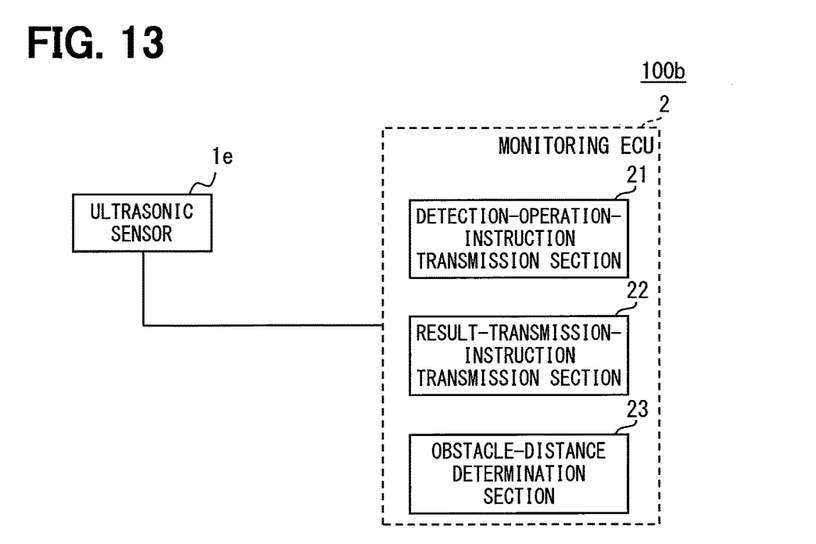
FIG. 13 is a block diagram illustrating an exemplary outline configuration of a sensor system 100b according to a third embodiment.

A sensor system 100b according to the third embodiment is similar to the sensor system 100 according to the first embodiment except that the former differs from the latter in the process of the monitoring ECU 2 and includes only one ultrasonic sensor 1. As illustrated in FIG. 13, the sensor system 100b includes an ultrasonic sensor 1e and the monitoring ECU 2. The ultrasonic sensor 1e is identical with the ultrasonic sensors 1a-1d, which have been described earlier.

Figure 14:
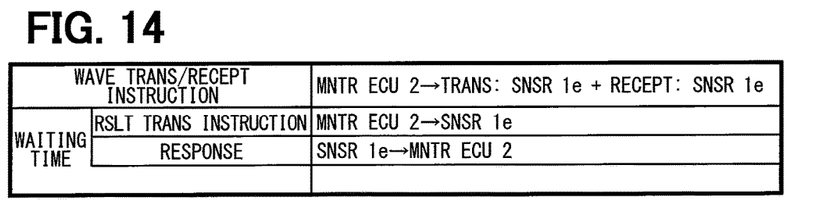
FIG. 14 is a diagram illustrating an exemplary sequence of events in the sensor system 100b according to the third embodiment between a wave transmission/reception instruction transmission from the monitoring ECU 2 and a response from an ultrasonic sensor 1e.

A sequence of events in the sensor system 100b between a wave transmission/reception instruction transmission from the monitoring ECU 2 and a response from the ultrasonic sensor 1e will now be described with reference to FIG. 14. In the example of FIG. 14, it is assumed, for the sake of convenience, that one detection operation is completed by allowing the ultrasonic sensor 1e to transmit an ultrasonic wave and receive the reflection of the transmitted ultrasonic wave.

As illustrated in FIG. 14, first of all, the monitoring ECU 2 starts a new detection operation of the ultrasonic sensor 1e by transmitting a wave transmission/reception instruction that instructs the ultrasonic sensor 1e to transmit an ultrasonic wave and receive the reflection of the transmitted ultrasonic wave.

During a waiting time for the new detection operation of the ultrasonic sensor 1e, the monitoring ECU 2 transmits a measurement result transmission instruction to the ultrasonic sensor 1e for the purpose of instructing the ultrasonic sensor 1e to transmit distance data that is stored in the storage section 15 as the result of the last detection operation. Upon receipt of the measurement result transmission instruction, the ultrasonic sensor 1e makes a response by reading the distance data stored in the storage section 15 and transmitting the read distance data to the monitoring ECU 2.

During a new detection operation of the ultrasonic sensor 1e, the configuration of the third embodiment enables the monitoring ECU 2 to receive distance data (that is, a detection result) that was measured during the last detection operation of the ultrasonic sensor 1e. Therefore, the detection intervals required for one set of detection operations of the ultrasonic sensor 1 can be reduced by receiving the detection result during the new detection operation of the ultrasonic sensor 1e.

The third embodiment has been described on the assumption that one ultrasonic sensor 1e is used as the sensor. However, an alternative configuration may be employed so that a sensor other than the ultrasonic sensor 1e is used as the sensor.

The present disclosure is not limited to the foregoing embodiments, but may be variously modified within the scope of the appended claims. The technical scope of the present disclosure also includes an embodiment that may be obtained by appropriately combining technical means disclosed in different embodiments.

The invention claimed is:

1. A sensor system comprising:
a plurality of sensors including ultrasonic sensors for distance measurement; and
a control device that is connected to the sensors through one signal line for serial communication,
wherein the control device includes a detection-operation-instruction transmission section that transmits a detection operation instruction to the plurality of sensors through the signal line in order to instruct the plurality of sensors to perform a detection operation;
wherein the plurality of sensors each include a detection result transmission section that transmits a detection result of the sensor through the signal line;
wherein the control device further includes a result-transmission-instruction transmission section that transmits through the signal line a result transmission instruction to instruct transmission of the detection result; and
wherein the result-transmission-instruction transmission section transmits the result transmission instruction, during a new detection operation that is newly performed, to all the sensors engaged in a last detection operation, and the detection result transmission section of each of the sensors having received the result transmission instruction transmits the detection result of the last detection operation during the new detection operation.

2. A sensor system comprising:

a sensor; and a control device that is connected to the sensor through one signal line-for serial communication, wherein the control device includes a detection-operation-instruction transmission section that transmits a detection operation instruction to the sensor through the signal line in order to instruct the sensor to perform a detection operation;

wherein the sensor includes a detection result transmission section that transmits a detection result of the sensor through the signal line;

wherein the control device further includes a result-transmission-instruction transmission section that transmits through the signal line a result transmission instruction to instruct transmission of the detection result; and wherein the result-transmission-instruction transmission section transmits the result transmission instruction, during a new detection operation, to the sensor engaged in a last detection operation, and the detection result transmission section of the sensor having received the result transmission instruction transmits a detection result of the last detection operation during the new detection operation.

3. The sensor system according to claim 1, wherein each of the sensors includes a sensor element and a computation circuit in addition to the detection result transmission section, and uses a differential amplifier circuit as an electrical circuit that delivers an input from the sensor element to the computation circuit, the computation circuit outputting to the detection result transmission section the detection result transmitted from the detection result transmission section on the basis of a signal from the sensor element.

4. The sensor system according to claim 1, wherein each of the sensors includes a sensor element and a computation circuit in addition to the detection result transmission section, the computation circuit outputting to the detection result transmission section the detection result transmitted from the detection result transmission section on the basis of a signal from the sensor element;

wherein the computation circuit and the detection result transmission section are provided in a multilayer substrate;

wherein the sensor element is electrically connected to the computation circuit through a connection section on the multilayer substrate;

wherein the multilayer substrate includes a first substrate on which the connection section is situated and a second substrate on which the detection result transmission section is situated, the first substrate and the second substrate being formed in different layers; and wherein the multilayer substrate further includes a ground layer between the first substrate and the second substrate.

5. The sensor system according to claim 4, wherein the sensor is configured so that the connection section on the first substrate and the detection result transmission section on the second substrate are positioned apart from each other in a planar direction of the multilayer substrate.

6. A control device used in the sensor system according to claim 1.

7. A sensor used in the sensor system according to claim 1.

* * * * *